Dec. 22, 1953         F. W. KRUEGER ET AL         2,663,481
                        FILLING MACHINE
Filed Sept. 16, 1947                            8 Sheets-Sheet 1

INVENTORS
FRANK W. KRUEGER
WILLIAM DE BACK
BY Philip G. Minnis
   Hans G. Hoffmeister
                ATTORNEYS

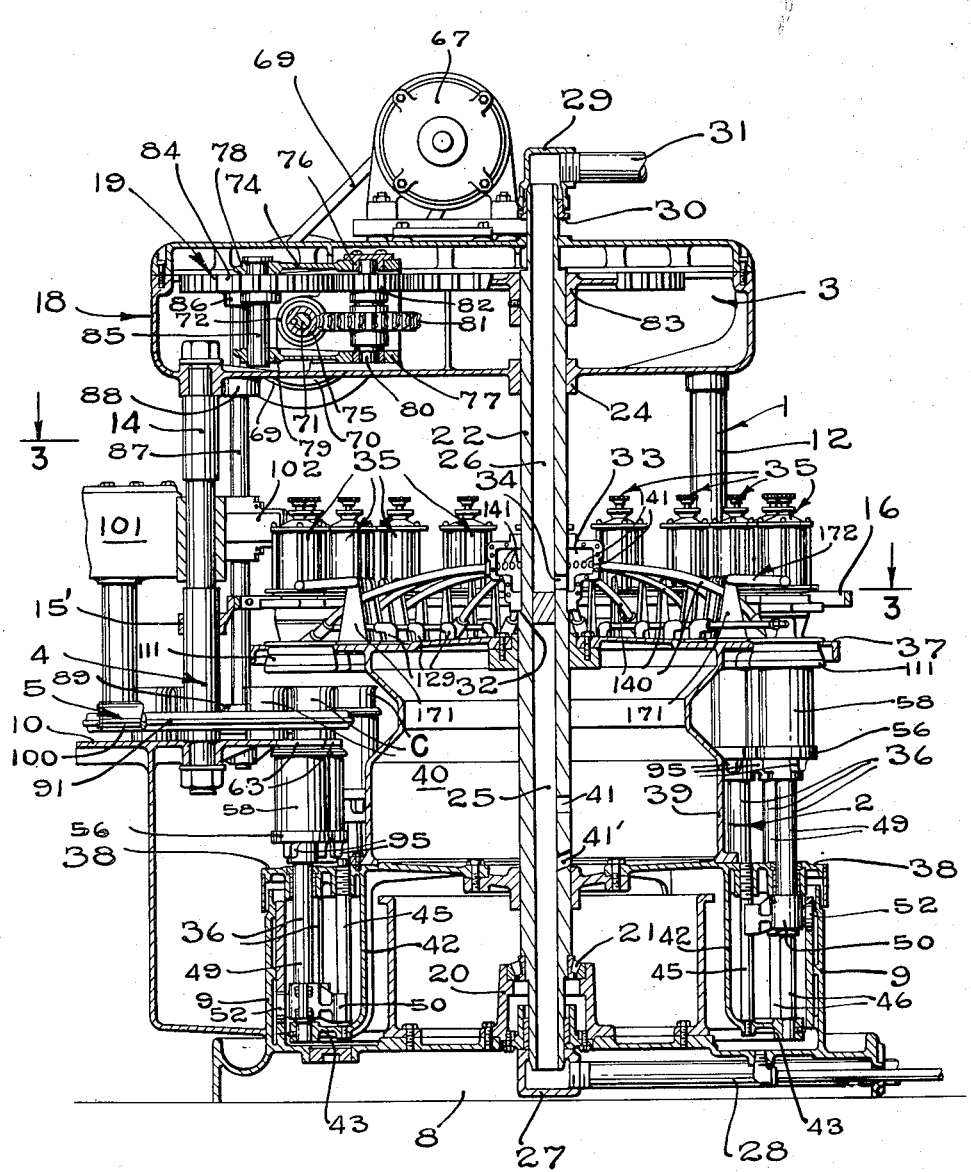

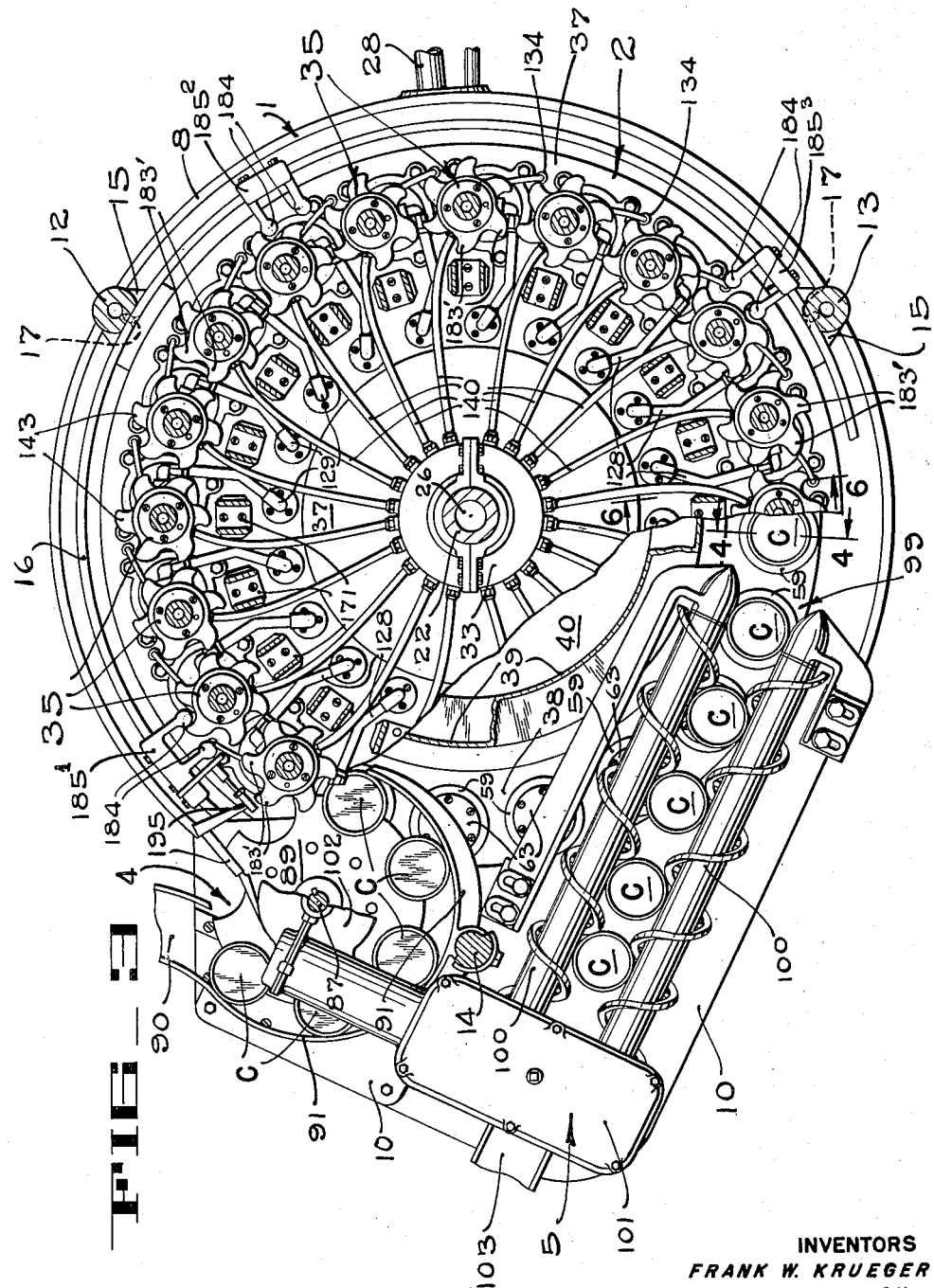

Dec. 22, 1953  F. W. KRUEGER ET AL  2,663,481
FILLING MACHINE
Filed Sept. 16, 1947  8 Sheets-Sheet 4
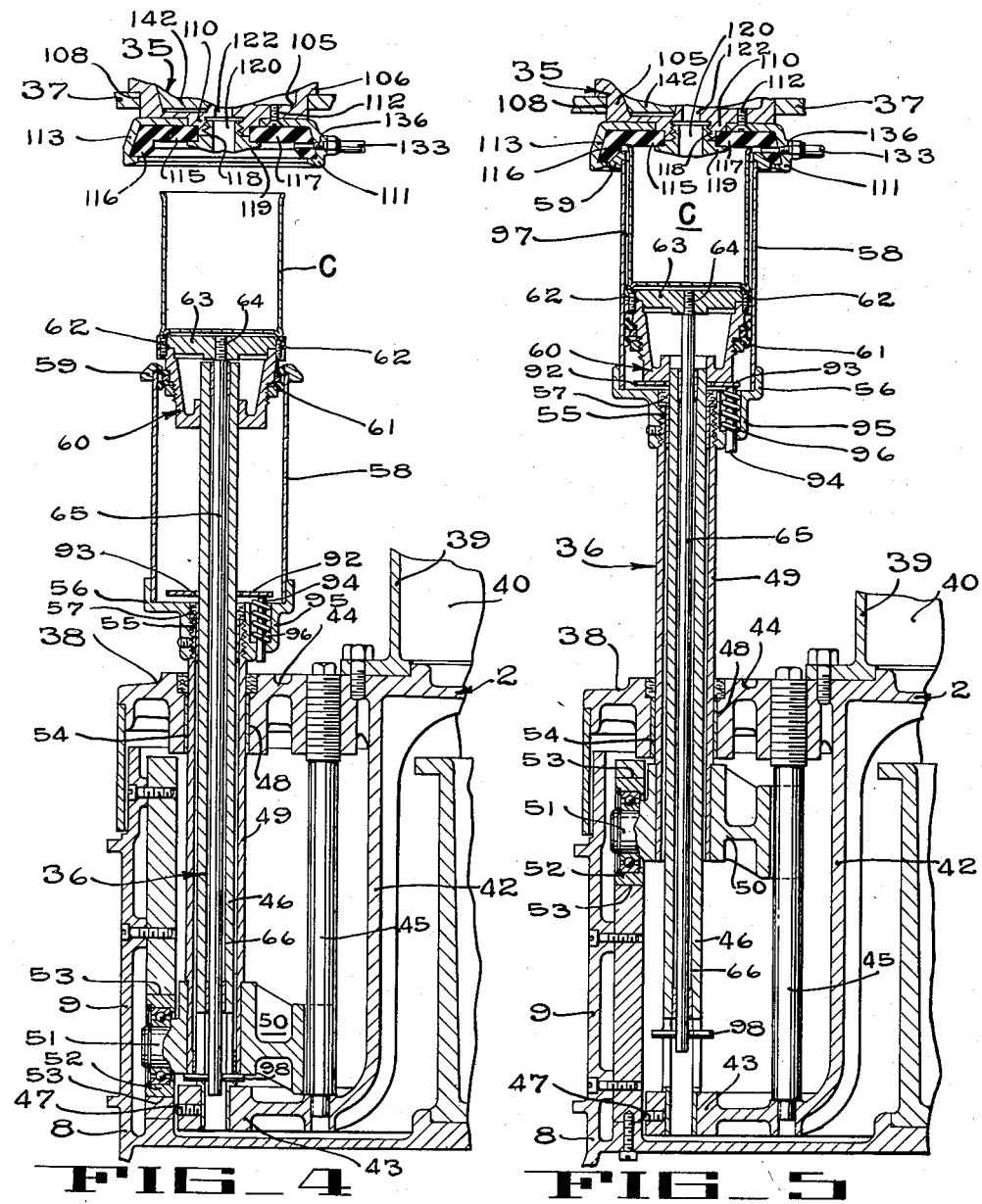
INVENTORS
FRANK W. KRUEGER
WILLIAM DE BACK
BY Philip A. Minnis
Hans G. Hoffmeister
ATTORNEYS

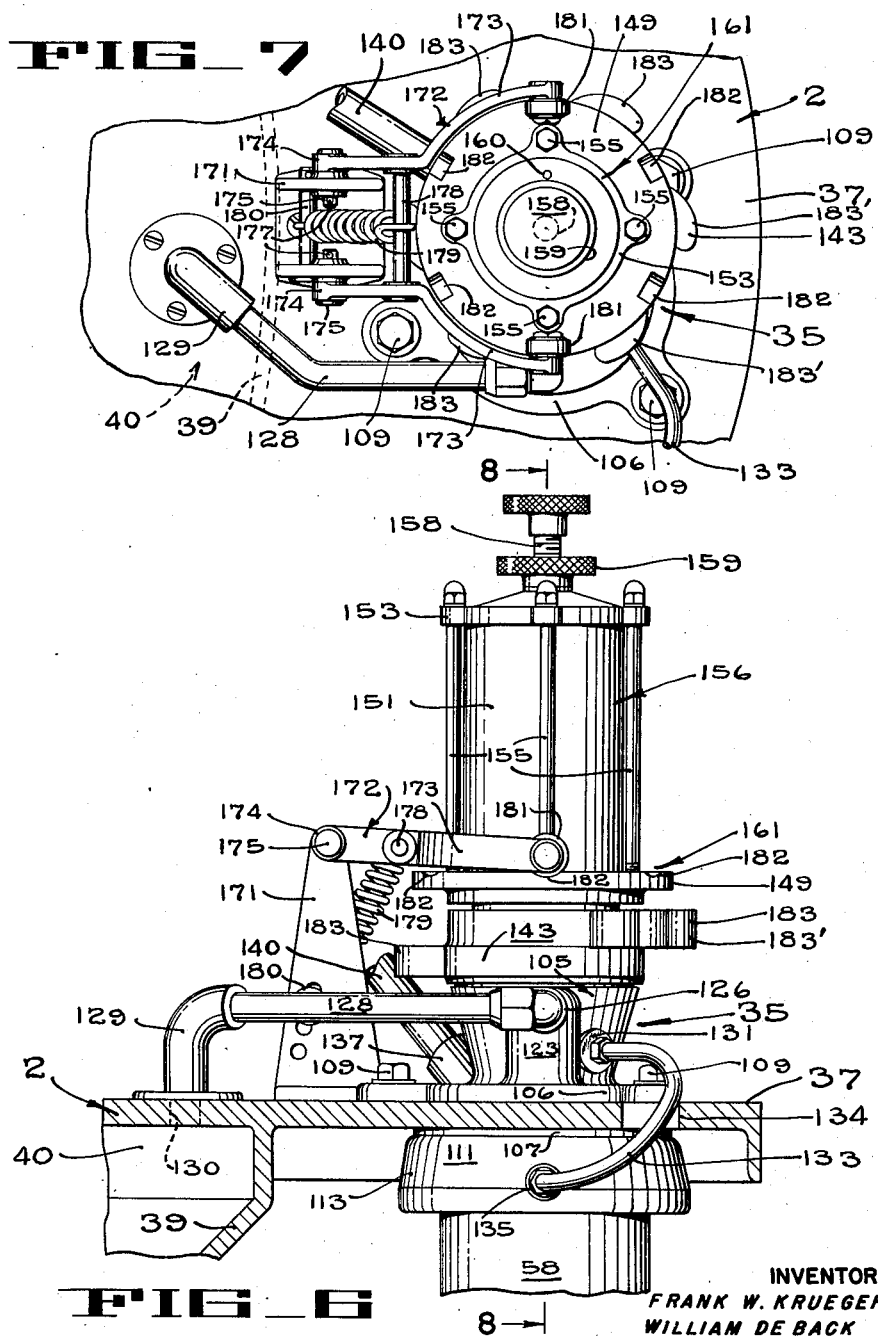

Dec. 22, 1953    F. W. KRUEGER ET AL    2,663,481
FILLING MACHINE
Filed Sept. 16, 1947    8 Sheets-Sheet 6
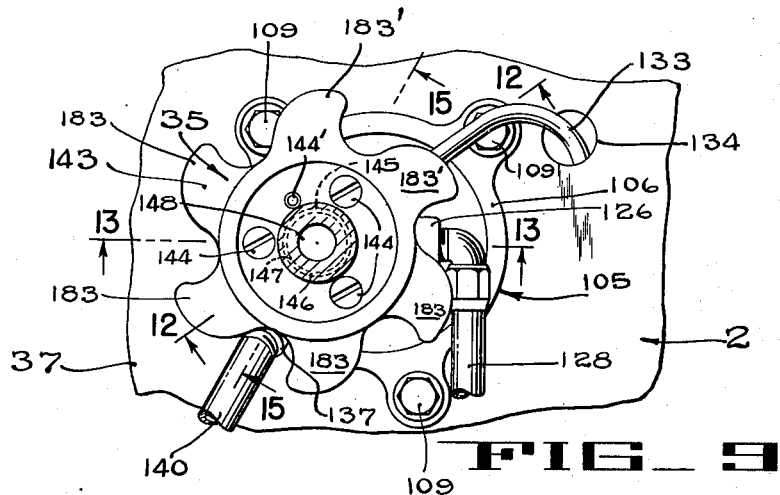
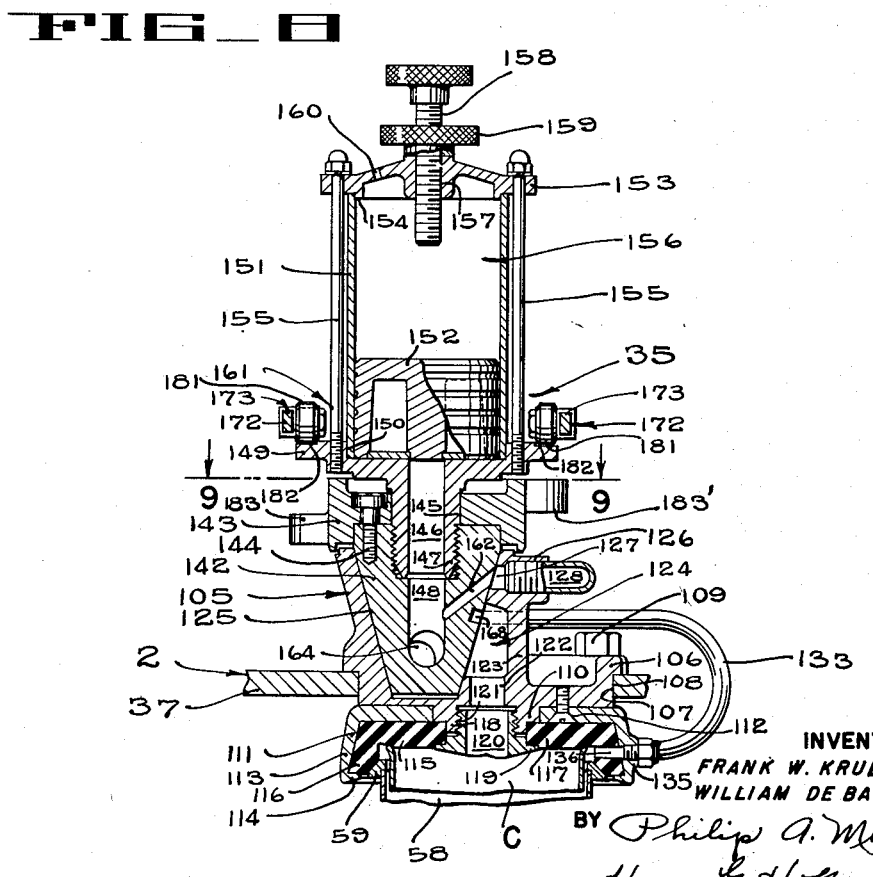
INVENTORS
FRANK W. KRUEGER
WILLIAM DE BACK
ATTORNEYS

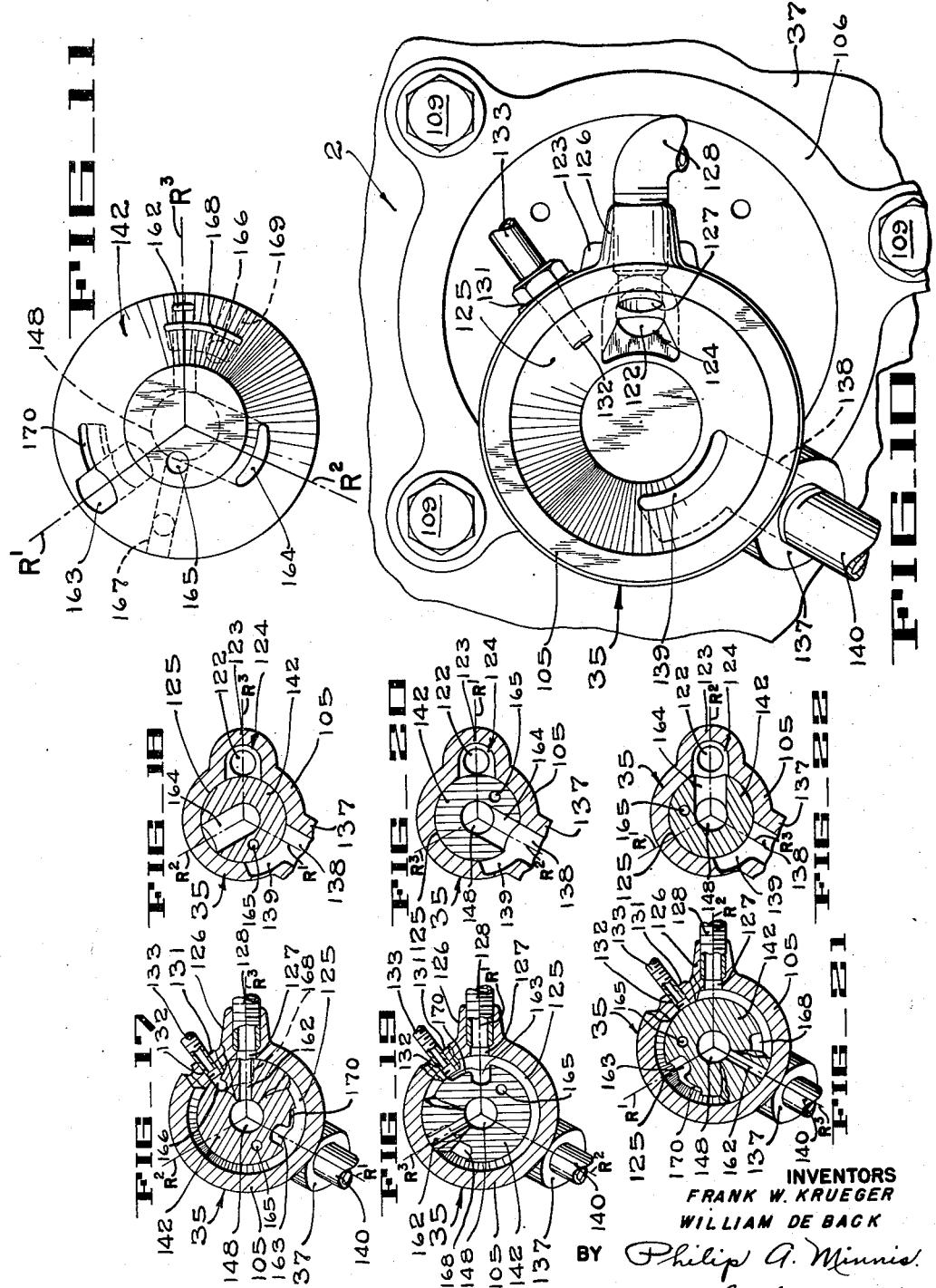

Dec. 22, 1953  F. W. KRUEGER ET AL  2,663,481
FILLING MACHINE
Filed Sept. 16, 1947  8 Sheets-Sheet 8
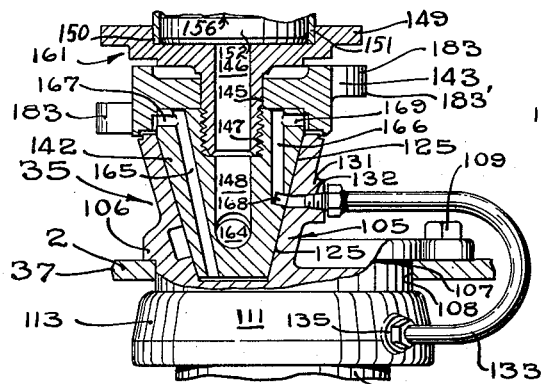
FIG_12
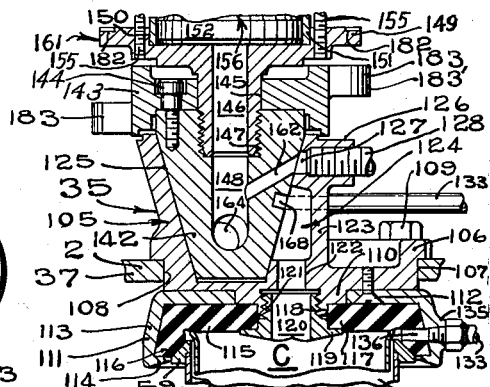
FIG_13
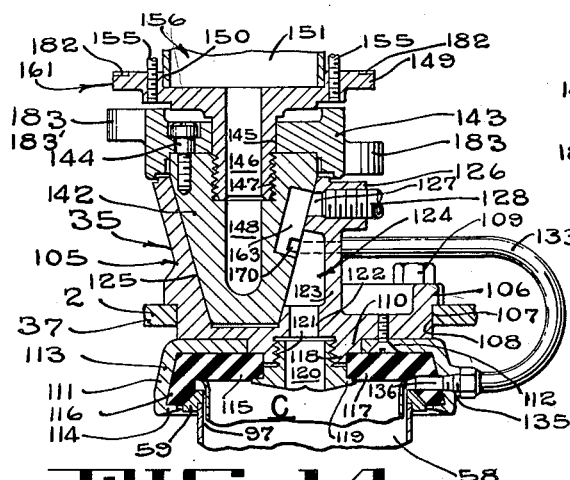
FIG_14
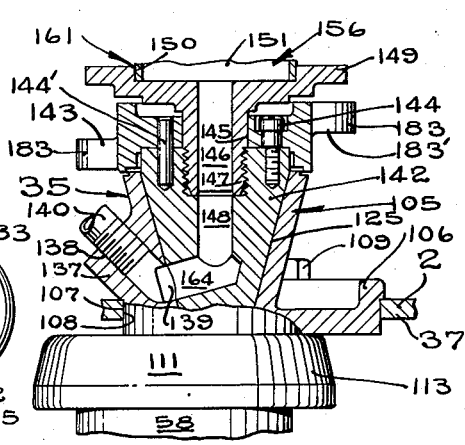
FIG_15
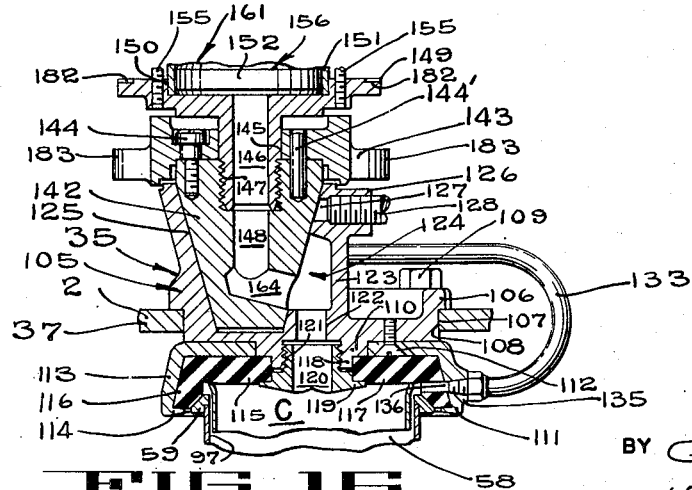
FIG_16
INVENTORS
FRANK W. KRUEGER
WILLIAM DE BACK
BY Philip A. Minnis.
Hans G. Hoffmeister.
ATTORNEYS Patented Dec. 22, 1953

2,663,481

UNITED STATES PATENT OFFICE 2,663,481

FILLING MACHINE

Frank W. Krueger and William de Back, San Jose, Calif., assignors to Food Machinery and Chemical Corporation, San Jose, Calif., a corporation of Delaware Application September 16, 1947, Serial No. 774,214

13 Claims. (Cl. 226—98)

This invention relates to filling machines of the vacuum type, and is concerned more particularly with the provision of an improved filling valve structure for dispensing liquids into containers, such as cans or glass jars.

One object of the present invention is to provide a metering filling valve for supplying a predetermined quantity of liquid to a container.

Another object is to provide a high vacuum metering valve for supplying a quantity of deaerated liquid to a container without aerating the liquid.

Another object is to provide a vacuum type filling mechanism for attaining high speed filling of containers with liquid under conditions compatible with the deaerated nature of such liquid.

Another object is to provide a filling valve mechanism for receiving and isolating a predetermined charge of liquid under a high vacuum and for depositing such charge of liquid into a pre-vacuumized container.

Another object is to provide apparatus for filling containers under a high vacuum without bursting, panelling, or collapsing the containers.

Other and further objects and advantages of the present invention will become apparent from the following description in connection with the drawings in which:

Fig. 2 is a vertical section of Fig. 1 taken along line 2—2 thereof.

Fig. 3 is a horizontal section through the machine taken substantially along line 3—3 in Fig. 2.

Fig. 4 is a vertical section of one lift mechanism of the filling machine taken along line 4—4 in Fig. 3.

Fig. 5 is a section similar to that of Fig. 4 showing portions thereof in a different position.

Fig. 6 is a section taken along line 6—6 in Fig. 3 showing an elevation of a filling valve unit embodying the present invention.

Fig. 7 is a plan view of the filling valve unit of Fig. 6.

Fig. 8 is a vertical section of the filling valve shown in Fig. 6 taken along line 8—8 thereof.

Fig. 9 is a horizontal section of Fig. 8 taken along line 9—9 thereof.

Fig. 10 is a plan view of the seat portion of the filling valve shown in Figs. 6 to 9, inclusive.

Fig. 11 is a bottom view of the cock portion of the filling valve shown in Figs. 6 to 9.

Fig. 12 is a fragmentary vertical section of the filling valve taken substantially along line 12—12 of Fig. 9.

Fig. 13 is a section similar to that of Fig. 8 taken along line 13—13 of Fig. 9.

Fig. 14 is a section similar to that of Fig. 13 with the valve cock disposed in a different position.

Fig. 15 is a section taken along line 15—15 in Fig. 9 with the valve cock disposed in the position shown in Fig. 14.

Fig. 16 is a section similar to those shown in Figs. 13 and 14 with the valve cock disposed in still another position.

Figure 1:
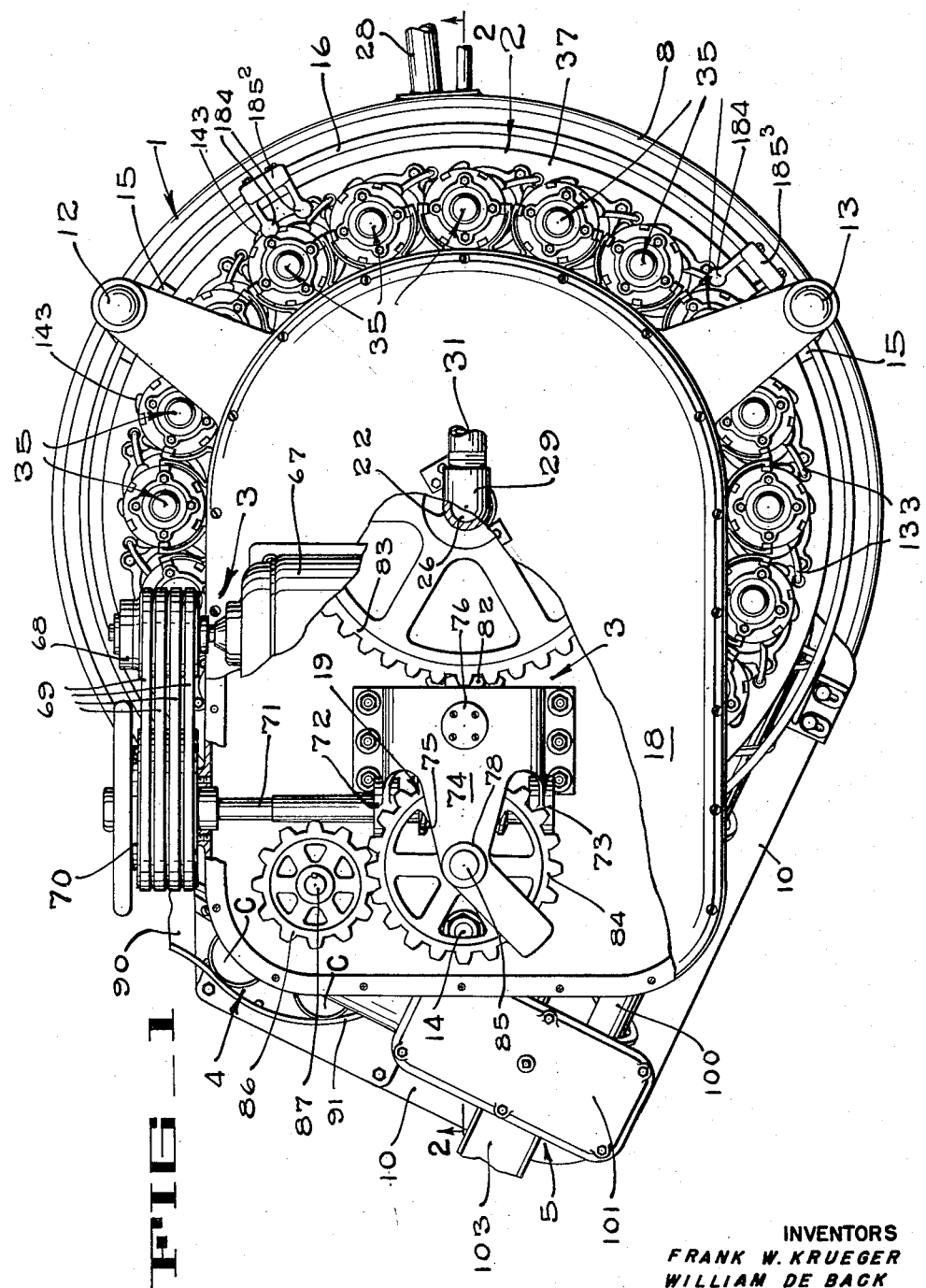
Fig. 1 is a plan view of a filling machine embodying the present invention, certain parts being broken away to disclose the drive mechanism of the machine.

Figs. 17 to 22, inclusive, are diagrammatic horizontal sections illustrating the relationship of the valve cock to the valve seat, Figs. 17, 19, and 21 being taken substantially in the upper region of the valve cock and seat, while Figs. 18, 20, and 22 are taken in the lower region of the same. In these illustrations, Figs. 17 and 18 are complementary views showing the cock in its neutral position relative to the valve seat, Figs. 19 and 20 illustrate the cock disposed in its first step away from neutral position, and Figs. 21 and 22 show the valve cock disposed in its second step away from neutral position.

The present invention (Fig. 2) is associated with a filling machine of conventional type comprising a frame 1, a movable turret 2, a drive mechanism 3, a feed mechanism 4, and a discharge mechanism 5.

The frame 1 comprises a base 8 provided with an upstanding annular wall 9 and a platform 10 formed integrally with one side of the base to provide a support for both the feed and the discharge mechanism 4 and 5, respectively. Extending upwardly in the frame 1 are three equally spaced legs 12, 13, and 14, seen also in Figs. 1 and 3. The legs 12 and 13 being similar to each other are supported by brackets 15 attached to the upstanding wall 9 of the base, whereas the leg 14, which is shorter than the others, is supported by the platform 10. These three legs are braced between their ends by an annular strap 16 secured to each of the legs 12 and 13 by machine screws 17 and in a like manner to a bracket 15' supported on the leg 14 (Fig. 2). Secured to the upper end of each leg 12, 13, and 14, is a gear housing 18 enclosing a power transmission unit 19 forming a part of the above mentioned drive mechanism 3.

The base 8 is provided with a pedestal 20 in which a thrust bearing 21 is seated (Fig. 2). Supported on the bearing 21 is the lower end of a tubular shaft 22 having its upper portion extending through the housing 18 and supported for rotation by a bearing 24 provided in the lower wall of the housing.

The tubular shaft 22 is blocked between its ends to provide a lower and an upper conduit 25 and 26, respectively. The lower conduit 25 extends through the base 8 into an eblow 27. The lower end of shaft 22 is of conical formation and rests in a seat formed in the elbow 27 to provide a seal and to permit rotation therebetween. The elbow 27 is secured to the base and is connected to a pipe 28 communicating with a vacuum pump, not shown, for establishing a vacuum for reasons later to be made apparent. The upper conduit 26 of the shaft 22 extends into a liquid tight elbow 29 and is secured thereto by a suitable packing nut 30 so as to permit rotation of the shaft relative to the elbow. The elbow 29 is connected to a liquid supply pipe 31 associated with a source of supply for feeding liquid therefrom into the filling machine.

The shaft 22 is provided with a shoulder formation 32 in the region of the blocked portion thereof and has a distributing chamber 33 secured thereto for rotation therewith. The upper conduit 26 is provided with a port 34 exposed to the chamber 33 for supplying liquid to the same for distribution in a manner later to be explained.

The turret 2 is secured to the tubular shaft 22 for rotation therewith and carries a plurality of filling valves 35 and a plurality of can lifts 36 associated with respect to each other.

The turret 2 comprises an upper and a lower disc 37 and 38, respectively, spaced from each other by a cylindrical web 39 to provide an air tight chamber 40 in conjunction therewith around the lower conduit 25 of the tubular shaft 22. The conduit 25 has several ports formed therein exposed to the chamber 40 (Fig. 2). One port 41 is provided for vacuumizing the chamber 40 and the other port 41' adjacent the floor of chamber 40 is provided for clearing the chamber of discharged matter, as will be later pointed out. Vacuumization of the chamber 40 provides a reservoir of vacuum for use in connection with the filling of containers.

The lower disc 38 includes a depending annular bracket 42 provided with a lateral flange portion 43 disposed parallel to the upper outer extremity 44 of the disc 38 for supporting the can lifts 36 in annular arrangement adjacent the periphery of the turret 2.

Each lift 36, Figs. 4 and 5, comprises a pair of spaced guide rods 45 and 46 disposed in alignment radially with respect to the axis of the turret 2. The guide rod 45 is secured at its lower and upper ends to the portions 43 and 44, respectively, while the guide rod 46 is secured to the lower flange portion 43 by a set screw 47 and extends upwardly through a bore 48 in the outer extremity 44 of the disc 38.

A sleeve 49 is slidably mounted on the guide rod 46 and has secured to its lower end a yoked casting 50 carrying a lateral stud 51 upon which a ball bearing roller 52 is mounted for rolling movement within a cam track 53. The cam track 53 is supported by the upstanding wall 9 of the base 8, concentrically with respect to the tubular shaft 22, i. e., the axis of rotation of the turret 2. The yoke portion of the casting 50 straddles the guide rod 45 to prevent turning of the sleeve 49 as the roller 52 travels along the cam track 53.

The sleeve 49 and guide rod 46 telescope relative to each other and the upper portion of the sleeve is guided for sliding movement in a bushing 54 provided in the bore 48. The upper end 55 of the sleeve 49 extends above the portion 44 of the disc 38 and has a cup shaped flange 56 threadedly secured thereto, the connection between the cup and sleeve being provided with suitable packing 57 to provide an air tight seal therebetween.

The cup shaped flange 56 supports a cylindrical shell 58 which is welded or soldered to the flange 56 so as to extend upwardly therefrom and the shell 58 is provided at its upper end with a conical rim 59 for reasons later to be made apparent. The guide rod 46 extends upwardly through the cylindrical shell 58 and has a piston structure 60 arranged to slide thereon and provided with a sealing ring 61 which engages the inner wall of the cylindrical shell 58.

Secured to the upper end of the piston 60 by machine screws 62 is a can table 63 which is threadedly connected to the reduced upper end 64 of a rod 65 having its lower end disposed for sliding movement in an axial bore 66 provided in the rod 46. Each can table 63 is normally disposed in its lowermost position, i. e., at the same level as the upper surface of the platform 10, see Fig. 2, to receive containers from the feed mechanism 4, as illustrated in Figs. 1, 2, 3, and 4.

Mounted on the upper wall of the housing 18 is a motor 67 (Figs. 1 and 2) having a multiple drive pulley 68 drivingly connected by belts 69, to another pulley 70 keyed to one end of a drive shaft 71 extending from the housing 18. The drive shaft 71 (Fig. 1) is suitably supported for rotation within the housing 18 by spaced bosses 72 and 73 formed on a bracket 74 secured to the lower wall of the housing, and a worm gear 75 is keyed to the shaft 71 for rotation therewith.

The bracket 74 is provided with a pair of vertically aligned bearings 76 and 77 adjacent one side of the shaft 71 and a pair of vertically aligned bearings 78 and 79 adjacent the other side of the shaft 71 (Figs. 1 and 2). The bearings 76 and 77 support a stub shaft 80 having a worm wheel 81 keyed thereto drivingly engaging the worm gear 75 on the drive shaft 71. Also keyed to the stub shaft 80 is a spur gear 82 which meshes with a gear 83 keyed to the tubular shaft 22 for turning the latter and turret 2. The spur gear 82 also meshes with a gear 84 keyed to a shaft 85 supported parallel to the stub shaft 80 by the bearings 78 and 79 of the bracket 74.

The gear 84 meshes with a gear 86 keyed to a shaft 87 providing an auxiliary drive for the feed and the discharge mechanism 4 and 5. This auxiliary drive shaft 87, Fig. 2, is suitably supported for rotation by a bearing 88, in the lower wall of the housing 18 and a thrust bearing (not shown) provided in the platform 10. The shaft 87 carries a star wheel 89 (Fig. 3) adjacent the platform 10 to receive containers fed onto the latter from an inlet chute 90 for moving the containers along an arcuate path adjacent a guide rail 91 supported by the short leg 14 of the frame 1. The star wheel 89 transfers the containers from the platform 10, individually, onto successive can tables 63, as the latter move one after another into registration with the containers nested between the points of the star wheel. The end of the guide rail 91 is so located as to release each container as it is properly positioned on a can table 63 so that the latter removes the container from the star wheel 89.

After each can table 63 has received a container, the roller 52 of the lift mechanism 36 associated therewith climbs an aclivity in the cam track 53. The sleeve 49 associated with the roller 52 rises therewith elevating the cylindrical shell 58 relative to the can table and container until the piston structure 60 therebelow is engaged by a pedestal 92 within the shell 58.

The pedestal 92 (Figs. 4 and 5) comprises a ring 93 encircling the guide rod 46 and having pins 94 extending downwardly into boss formations 95 in the cup shaped flange 56. Each pin 94 is encircled by a compression spring 96 seated in the respective boss formation 95 and bearing against the underside of the ring 93 for maintaining it in spaced relation with respect to the floor of the flange 56.

The springs 96 are of sufficient strength to maintain the ring 93 spaced from the flange 56 when the ring supports the piston structure, can table, and container and, consequently, the container will extend slightly above the conical rim 59 of the shell. The shell and container, therefore, rise in unison until the open upper rim of the container engages the filling valve unit 35 thereabove, whereupon, the springs 96 yield allowing the cup shaped flange and cylindrical shell to rise with respect to the container. The shell 58 rises until the conical upper rim 59 thereof engages the filling valve unit 35 and the container is thereby completely enclosed within a jacket 97 provided by the cup shaped flange, cylindrical shell, and the filling valve unit. In this condition, the containers are conveyed through a predetermined path of travel by the turret 2 as it rotates within the frame 1.

At the opposite end of the path of travel of the containers, the roller 52 on the yoke casting 50 of the lift 36 descends a declivity in the cam track 53, thereby lowering the cylindrical shell 58. A pin 98 extending laterally from the lower end of the rod 65 is engaged by the yoke casting 50, thereby positively lowering the can table 63 to the level of the platform 10. The containers carried by the can tables 63 then successively enter the mouth 99 of the discharge mechanism 5.

The discharge mechanism 5 is of a conventional construction comprising spaced twin screws 100 suitably supported above the platform 10 to receive the containers from the turret 2. These screws 100 are drivingly associated with a transmission within a housing 101 having a power take-off unit 102 operatively connected to the auxiliary drive shaft 87 (Figs. 2 and 3) in a well known manner. The twin screws are rotated upwardly and outwardly with respect to each other and have opposing convolutions calculated to accelerate the transfer of a container from a can table 63 onto the platform 10 while the can table continues moving in its circuitous path away from the container. The screws 100 subsequently discharge the containers one after another into an outlet chute 103.

The filling valves 35 (Figs. 6, 7, and 8) are supported adjacent the periphery of the upper disc 37 of the turret 2 in vertical alignment with the respective lifts 36 associated therewith.

Each filling valve 35 (Figs. 6 to 9) comprises a body 105 having a flange 106 resting on the disc 37, and a reduced circular portion 107 fitting into an opening 108 provided in the disc 37. The flange 106 is secured to the disc 37 by bolts 109 extending through bosses formed on the flange 106. The reduced portion 107 of the body 105 has an axially aligned nipple 110 extending downwardly therefrom to receive a cap 111 below the disc 37. Each cap is secured to the reduced portion of the body by countersunk head screws 112 and has a skirting or annular wall 113 provided with an inwardly extending annular lip 114. The inner wall of the cap 111 is lined with a rubber sealing ring 115 having a depending periphery 116 retained within the cap 111 by the annular lip 114 and having a central portion 117 surrounding a reduced end 118 of the nipple 110. The central portion 117 of the ring 115 is secured to the nipple 110 by the cap portion 119 of a cylindrical plug 120 threadedly connected to a tapped portion 121 of a central bore 122 provided in the body 105.

Above the disc 37 the body 105 has a central portion 123 providing a chamber 124 in alignment with the central bore 122 of the body. Adjacent the central portion 123 (Fig. 10), the body 105 is provided with a frusto conical seat formation 125 which communicates with the chamber 124. Formed on the body 105 integrally with the central portion 123, but above the chamber 124 (Figs. 8 and 9) is a neck portion 126 provided with a vacuum port 127 which is in communication with the frusto conical seat 125. A tube 128 having one of its ends threaded into the port 127 has its opposite end connected to an elbow 129 secured to the disc 37 in registration with a hole 130 provided in the disc, above and in communication with the vacuum chamber 40 (Figs. 6 and 7).

Formed on the body 105 is a boss formation 131 which is slightly counterclockwise of the neck portion 126, see Figs. 10, 12, 17, 19, and 21. The boss 131 is provided with a bore 132 extending through to the seat 125 and is internally threaded to receive one end of a by-pass tube 133 which extends through an opening 134 in the outer portion of the disc 37. The opposite end of the by-pass tube 133 is threadedly connected by a nipple to a boss 135 formed on the skirting 113 of the sealing cap 111. The boss 135 is provided with a bore 136 communicating with the tube 133 and extending through the depending periphery 116 of the sealing ring 115 so as to communicate with the interior of the cap 111.

120 degrees clockwise of the central portion 123 (Figs. 10, 14, 18, 20, and 22) the body 105 is provided with a boss formation 137 having a bore 138 providing a liquid inlet exposed to an arcuate recess 139 in the seat 125. The boss 137 is provided with an internal thread for receiving the threaded end of a liquid supply tube 140 having its opposite end threadedly connected to the adjacent side wall (Figs. 2 and 3) of the distributing chamber 33 and in communication with a port 141 formed in the side wall of the chamber 33.

Disposed in the frusto conical seat 125 is a cock 142 having its upper larger end extending above the body 105 and carrying a star wheel 143 in spaced relation with respect to the upper surface of the body 105. The star wheel 143 is secured to the cock 142 by bolts 144 and is properly indexed with respect to the cock by an indexing pin 144′ (Figs. 9, 15, and 16) for reasons hereinafter to be made apparent. The star wheel has a central bore 145 through which extends a nipple 146 having its threaded lower end secured to a threaded portion 147 of a bore 148 in the cock. The upper end of the nipple 146 is formed integrally with a circular plate 149 provided with a recessed upper surface 150 in which the lower end of a cylindrical shell 151 is disposed. A piston 152 (Fig. 8) is arranged within the shell 151 for sliding movement longitudinally thereof and the upper end of the shell is closed by a cap 153. The cap 153 is provided with a depending flange 154, which is pressed down into the shell and the cap 153 is drawn toward the plate 149 by long bolts 155 to provide a metering chamber 156 within the shell 151. The cap 153 is provided with a tapped bore 157 into which an adjusting screw 158 is threaded so that the shank of the screw extends into the chamber 156 to limit movement of the piston 152 toward the cap 153 for reasons later to be made apparent. The screw 158 carries a threaded lock nut 159 above the cap 153 and this lock nut is adapted to bear against the cap to lock the screw 158 in any desired position of adjustment. The cap 153 is also provided with a hole 160 (Figs. 7 and 8) for venting the upper region of the metering chamber to permit up or down movement of the piston 152 due to any differential in pressure between the upper region of the chamber 156 and the region thereof below the piston including the passage in the nipple 146 and the central bore 148 in the cock.

From the foregoing, it is apparent that the cock 142, star wheel 143, and metering chamber 156 constitute a unit 161 which is supported upon the body 105 for rotation relative thereto.

The cock 142 (Fig. 11) is provided with a plurality of ports, the main ones of which are disposed 120 degrees from each other around the central bore 148 in the cock. For explanatory purposes, the 120 degree location of each main port is designated in the drawings by a radially disposed reference line $R^1$, $R^2$, and $R^3$, respectively, see Figs. 11, and 17 to 22. A diagonal bore 162 provides the port at reference line $R^3$ and this bore 162 is adapted to communicate the central bore 148 of the cock with the vacuum port 127 (Figs. 8 and 13). The port on reference line $R^1$, is provided by a recess 163 adapted to simultaneously register with both the vacuum port 127 and the central chamber 124 of the body 105 (Fig. 14). The port located along reference line $R^2$ is provided by a large bore 164 extending diagonally upward into communication with central bore 148 of the cock. This bore 164 is adapted to register with either the liquid inlet port 138 (Fig. 15) or the central chamber 124 in the body 105 of the filling valve (Fig. 16).

The cock 142 is also provided with venting bores 165 and 166 (Fig. 12). The bore 165 extends from the top to the bottom of the cock and has a lateral bore 167 communicating with atmosphere by way of the space between the upper surface of the body 105 and the star wheel 143 for venting the space below the lower end of the cock 142 at the base of the seat formation 125. The other venting bore 166 extends from the top of the cock to a horizontal groove 168 extending circumferentially of the cock to a point beneath the diagonal bore 162 on reference line $R^3$ (Figs. 12 and 13). The horizontal groove 168 is adapted to register simultaneously with the central chamber 124 and the bore 132 leading to the by-pass tube 133. The venting bore 166 is also provided with a lateral bore 169 communicating with atmosphere between the body 105 and the star wheel 143 for venting the horizontal groove 168. Consequently, the chamber 124 and the by-pass tube 133 are simultaneously vented when the reference line $R^3$ registers with the chamber 124 of the body 105.

The cock 142 is provided, further, with an arcuate groove 170 (Fig. 14) extending circumferentially, clockwise (Fig. 11) from the recess 163 on reference line $R^1$ and adapted to communicate with the bore 132 leading to the by-pass tube 133 when the recess 163 registers with the central chamber 124 of the body 105.

Secured to the upper surface of the disc 37 adjacent each filling valve 35 is a trunnion carriage 171 (Figs. 6 and 7), pivotally supporting a yoke 172. The yoke 172 comprises a pair of arms 173 each provided with a bossed end 174 through each of which a headed pin 175 extends. The pins 175 also extend through the trunnion carriage 171 and cotter keys 177 are provided for holding the yoke arms 173 on the pins. The arms 173 are united adjacent the circular plate 149 by a cross arm 178 over which is hooked one end of a tension spring 179 having its opposite end suitably anchored to a cross bar 180 supported on the trunnion carriage 171.

The free end of each arm 173 is arcuated to conform to the shape of the periphery of the circular plate 149 (Fig. 7), and each arm carries a roller 181 at its extreme end. The rollers 181 are disposed to bear down upon the upper surface of the plate 149 at diametrically opposite sides of the same to maintain the unit 161 in place upon the body 105 and to hold and press the cock 142 into sealing contact with the seat formation 125 in the body 105. The plate 149 is provided, adjacent its periphery, with six equally spaced depressions 182 in which the rollers 181 are adapted to seat to prevent overriding of the unit 161 when it is intermittently advanced in a manner which will now be explained.

Each star wheel 143 (Fig. 9) is provided with six equally spaced radially disposed teeth 183 indexed by the pin 144' with respect to the ports provided in the cock along lines $R^1$, $R^2$, and $R^3$. The teeth 183 are adapted to successively engage rack pins 184 (Fig. 3) when the turret 2 is rotated in the manner as above explained. The rack pins 184 are arranged in pairs on separate brackets $185^1$, $185^2$, $185^3$, suitably secured to the annular strap 16 at predetermined positions adjacent the perimeter of the turret. The first and third brackets $185^1$ and $185^3$, respectively, are substantially diametrically opposite each other with respect to the turret 2 and the second bracket $185^2$ is located substantially midway between the first and third brackets.

The first bracket $185^1$ is located a short distance from the feed mechanism 4 so that its rack pins 184 will be engaged by two teeth 183 of the star wheel shortly after elevation of a container into contact with the sealing ring 115 of the filling valve. The two rack pins 184 of the first bracket $185^1$ are engaged, successively, by two teeth 183 of the star wheel 143 to advance the star wheel and the unit 161 a circumferential distance equal to one-third of a complete revolution or 120 degrees. The unit 161 is again advanced 120 degrees as two teeth of the star wheel 143 engage the rack pins 184 of the second bracket $185^2$. Just prior to the arrival of the container and filling valve opposite the mouth 99 of the discharge mechanism 5, the unit 161 is again advanced 120 degrees due to the engagement of two of the teeth of the star wheel with the rack pins 184 of the third bracket $185^3$.

From the foregoing it is apparent that the unit 161 is intermittently advanced in steps of 120 degrees each as the filling valve 35 travels from the feed to the discharge mechanism to thereby turn the unit 360 degrees, or one complete revolution during each filling operation.

In operation, the filling machine is constantly supplied with liquid under pressure via the supply pipe 31, a vacuum of approximately 28 inches of mercury is established in the vacuum chamber 40, and the turret, feed, and discharge mechanisms are driven in timed relation by the drive mechanism 3. The containers enter the machine open end up by way of the feed chute 90 and in the following description, for purposes of clarity, the progress of a single container C through the filling machine is given.

The star wheel 89 of the feed mechanism 4 receives the container C and advances it into registration with the can table 63 of one of the lifts 36 which removes the container from the star wheel and carries it along the circuitous path provided by the turret 2.

Each filling valve 35 is normally in closed or non-filling condition (Figs. 12, 13, 17, and 18) as the can table associated therewith receives a container from the star wheel 89. It should be understood that the feed mechanism is provided with a conventional "no-can no-fill" device 195 (Fig. 3) whereby to forestall operation of the filling valve when there is no container on the can table associated therewith. In this connection, it will be noted in Figs. 8 and 9 that the first two teeth 183' on the star wheel 143 of each filling unit 161 are in a higher plane than the remaining teeth thereof. Moreover, the rack pins 184 of the first bracket 185¹ are normally held in an inactive position and are adapted to engage the teeth 183' only when the presence of a container is detected on the can table by the device 195. The rack pins 184 of the second and third brackets 185², 185³ are adapted to be engaged only by teeth 183 which are disposed in a plane below the teeth 183' and, consequently, operation of the filling unit 161 is entirely eliminated whenever the lift associated therewith is without a container.

During movement of the container C from the feed mechanism toward the first bracket 185¹, the container is elevated into sealing engagement with the sealing ring 115 and the conical rim 59 of the shell 58 is also elevated and brought into sealing engagement with the depending periphery 116 of the ring 115. The unit 161 is in neutral position, as shown in Figs. 12, 13, 17, and 18, during the foregoing movement of the container so that the pressure within the container is equalized with the pressure within the jacket 97 by way of the horizontal groove 168 in the cock and the by-pass tube 133, both of which are vented to atmosphere through the bores 166 and 169. Simultaneously therewith the central bore 148 of the cock 142 is vacuumized due to registration of the diagonal bore 162 with the vacuum port 127.

Since the region of the metering chamber 156 above the piston 152 is in communication with atmospheric pressure through the hole 160 in the cap 153, it follows that the piston is caused to drop to its lowermost position (Fig. 8) by reason of the pressure differential between the upper region of the chamber 156 and the central bore 148 in the cock.

As the filling valve 35 associated with the container C passes the first bracket 185¹, the rack pins 184 are engaged by the teeth 183' causing turning of the unit 161 relative to the valve body 105, 120° from neutral position, to thereby dispose reference line R¹ in registration with the central chamber 124 in the body 105 (Figs. 14, 15, 19, and 20). Consequently, the large bore 164 at the bottom of the cock 142 registers with the liquid supply port 138 (Figs. 15 and 20) and liquid from the supply tube 140 is promptly transferred into the vacuumized bore 148 preferably under approximately 10 lbs. pressure. The pressure of the liquid entering below the piston 152 being in excess of the atmospheric pressure prevailing above the same causes the piston to rise until it is stopped by engagement with the adjusting screw 158. The screw 158 has been set, previously, so as to permit only a predetermined, desired, and accurately measured quantity of liquid to enter the metering chamber 156 and the bores 164—148 associated therewith. Simultaneously with the ingress of liquid into the metering chamber and bore 148 of the valve cock, as stated above, the container C and jacket 97 are vacuumized due to registration of the recess 163 and arcuate groove 170 in the cock with the central chamber 124, vacuum port 127, and the by-pass tube 133 in the body 105, see Figs. 14 and 19.

It should here be noted that vacuumization of the container and jacket strengthens the seal between the open upper end of the container C, the conical rim 59 of the shell 58, and the sealing ring 115 to thereby maintain the container and jacket vacuumized so far as is practicably possible. Consequently, when, in passing the second bracket 185², the unit 161 is advanced 120° further from neutral position, i. e., into its secondary position in which the reference line R² registers with the central chamber 124 (Figs. 16, 21, and 22) the prevacuumized container registers with the bores 164—148 associated with the metering chamber 156. Due to the atmospheric pressure prevailing above the piston 152 and the vacuumized condition of the container, the piston is forced down to its lowermost position and the liquid therebelow is promptly transferred into the container C filling the same to the desired level.

As the particular filling valve passes the third bracket 185³, the unit 161 is advanced another 120° step to register the reference line R³ with the central chamber 124 in the body 105. In other words, the unit 161 is now 360° from starting position and, therefore, again in the neutral position illustrated in Figs. 12, 13, 17, and 18. Consequently, the central chamber 124 is again vented or in communication with atmospheric pressure by way of the arcuate groove 170 and ports 168, 169, while the jacket 97 is likewise vented by way of the groove 170 via the by-pass tube 133.

From the foregoing, it is apparent that the pressure in the container C is always maintained the same as, or equalized with, the pressure in the jacket 97 and that both the container and jacket are simultaneously brought to atmospheric pressure. In this manner, paneling or the collapse of the container C is prevented and the container and conical rim 59 of the shell 58 are released from sealing contact with the sealing ring 115 to permit descent of the shell 58 when the roller 52 descends the declivity in the cam track 53.

As the lift mechanism 36 approaches its lowermost position, the yoked casting 50 engages the pins 96 projecting from the rod 65 to urge the same and the can table 63 downward until the can table is brought to the level of the platform 19. The filled container C is then transferred into the mouth 98 of the discharge mechanism, across the platform 19 and out onto the chute 199 for conveyance to a closing machine, not shown.

In connection with the foregoing operation it will be noted that the filling machine disclosed in the drawings is provided with twenty filling units 35. It is intended that the filling machine be operated at a speed suitable for handling some 300 containers per minute. It, therefore, follows that during one minute of operation each filling unit will handle approximately 15 containers and that each cycle during which one container is handled, is of approximately four seconds duration. Moreover, since the container, itself, is in communication with a valve 35 only while traveling between the first and third brackets 185¹—185³, and, since these brackets are disposed substantially diametrically opposite each other across the turret, the container is actually in sealed relation with the valve only during one half the time it takes the valve to travel through one cycle of operation, or a period of approximately two seconds.

It is during the first second of the foregoing period that the metering chamber 156 receives a charge of liquid and during the next second that the charge of liquid is transferred from the metering chamber into the container. Since the metering chamber and container are each vacuumized prior to receiving the charge of liquid, it is obvious that the transfer of the liquid into either of them is accomplished promptly, without the development of air pockets and, accordingly, without foaming of the liquid or aeration thereof. Consequently, the container, when released from beneath the filling valve, is filled to the desired level with a substantially calm non-foaming liquid and is, therefore, ready for immediate covering.

Should it be desired to increase the speed of the filling machine so as to handle a greater number of containers per minute, the liquid should be fed into the supply pipe 31 at a proportionately greater pressure so as to assure complete filling of the metering chamber 156 during communication thereof with the supply tube 140. The transfer of the liquid into the metering chamber is thus quickened to correspond with the split second operation of the filling valve so as to assure that a full measured charge of liquid will be transferred into the container during the balance of the filling operation.

One advantage of the foregoing construction of the filling valve resides in the fact that the filling unit 161 is supported in an erect position above the turret solely by reason of the manner in which the cock 142 fits into the frusto conical seat formation 125 in the body 105. Also in that the unit 161 is held down upon the body 105 only by the spring urged yoke 172 and is, therefore, easily removed for cleaning or repairs. Moreover, the cock and body are preferably made from a nickel alloy so as to withstand the effects of acids, especially the acids from the juices of citrus fruits. Therefore, the abutting faces of the cock and seat are not likely to become corroded or otherwise pitted, and, consequently, will slide smoothly with respect to each other without the need of a lubricant.

Due to the angle of the cone face of both the cock 142 and the seat formation 125, the two are maintained in proper sealing relation with respect to each other by the spring urged yoke 172. Although exposure of the cock 142 to the vacuum port 127 might normally cause the cock to bind relative to the conical seat formation 125, since the base of the seat is in constant communication with atmospheric pressure by way of the venting bores 165, 167, this binding effect of the vacuum upon the cock is minimized. It is, therefore, apparent that the valve structure of the present invention is such as to have nongalling, nonlocking action during operation.

Having thus described the construction and operation of the filling machine of the present invention, it will be apparent to those skilled in the art that the foregoing is illustrative of the preferred embodiment of our invention and is susceptible of various modifications and alterations. We, therefore, desire to avail ourselves of all modifications and alterations coming within the purview of the appended claims.

What we claim as new and desire to protect by Letters Patent is:

1. A filling machine comprising a source of vacuum, a source of liquid, a filling head for sealingly engaging a container, said head having a plurality of passages and chambers including a metering chamber and a chamber in flow communication with the container, a valve entirely within said filling head, and means for operating said valve successively through a plurality of positions for interconnecting said chambers and said sources of liquid and vacuum by means of said passages, said valve having a first position communicating said metering chamber with said source of vacuum, a second position communicating the container with said source of vacuum while communicating said metering chamber with said source of liquid to fill said metering chamber, and a third position communicating said metering chamber with the container for transferring the liquid from said metering chamber to the container.

2. A filling machine comprising means for engaging a container, means for presenting a container to said container engaging means and for providing a jacket around the container, a valve operatively associated with said container engaging means, a source of vacuum and a source of liquid each separately communicating with said valve, a metering chamber associated with said valve, and means for operating said valve in steps for first communicating said jacket and container with atmosphere while connecting said metering chamber to the source of vacuum, then the vacuumized metering chamber with the source of liquid to introduce liquid into the metering chamber while connecting the container and jacket with the source of vacuum, and then the chamber and container with each other for depositing a predetermined charge of liquid from the metering chamber into the latter.

3. A filling machine comprising a filling head for sealingly engaging a container, means providing a jacket around said container, a valve associated with said filling head, a source of vacuum and a source of liquid under pressure greater than atmospheric each separately communicating with said valve, a metering chamber associated with said valve, and means for operating said valve in steps for intermittently communicating the container and jacket with atmosphere while connecting the metering chamber with said source of vacuum, then the container and jacket with said source of vacuum while connecting the metering chamber with the source of liquid to fill the metering chamber with liquid, and finally the metering chamber with the container for transferring a predetermined charge of liquid from the metering chamber into the container.

4. In combination with a filling machine provided with a source of vacuum and a source of liquid under pressure, a filling valve comprising a filling head for sealingly engaging a container, means providing a jacket around said container, a metering chamber having a vented portion, a valve connected with said metering chamber and said filling head, a sealed, floating piston in the metering chamber between the vented portion thereof and the valve, means for intermittently moving said valve first into a position for communicating said container and jacket with atmosphere, the valve in said first position also connecting the source of vacuum with the metering chamber to actuate the piston and vacuumize the metering chamber, then into a position for connecting the source of vacuum with the container and jacket while connecting the metering chamber with a source of liquid to operate the piston and fill the metering chamber with liquid, and then for communicating the container with the metering chamber to again retract the piston and to transfer the liquid from the metering chamber into said container.

5. In combination with a filling machine provided with a source of vacuum and a source of liquid under pressure greater than atmospheric, a filling valve comprising a filling head for sealingly engaging a container, means for sealingly engaging the filling head and for providing a jacket enclosing the container, said filling head having a by-pass tube communicating with said jacket, a metering chamber provided with a vent in one end thereof, a cock in said filling head having a bore opening into said chamber opposite the vented end thereof, a sealed, floating piston in said chamber, means for limiting movement of the piston toward the vented end of the chamber to adjust the capacity of said chamber, said cock having a plurality of ports for normally venting the by-pass tube and container to atmosphere while registering said bore and said metering chamber with the source of vacuum, means for turning said cock in steps relative to the filling head for registering said bore and said metering chamber with the source of liquid to force the piston toward the vent and thereby to introduce a predetermined quantity of liquid into said chamber while registering the container and by-pass tube with said source of vacuum to equally vacuumize the container and jacket, and for subsequently sealing the vacuumized jacket while registering the bore in said cock and said metering chamber with the container for transferring said predetermined quantity of liquid from the metering chamber into the container.

6. In a filling machine provided with a source of vacuum and a source of liquid under pressure greater than atmospheric, a filling valve comprising a filling head for sealingly engaging a container presented thereto, a metering chamber vented to atmosphere, a cock in said filling head having a bore opening to said chamber, a sealed, floating piston in said chamber between the vented portion thereof and said bore, said cock being normally disposed with its bore in registration with said source of vacuum to vacuumize the metering chamber and reduce the pressure on one side of the floating piston, the other side of the piston being exposed to atmospheric pressure to force the piston toward the cock, means for intermittently moving the cock relative to the filling head for registering its bore with the source of pressurized liquid to transmit the pressure of the liquid to one side of the piston, the other side of the piston being exposed to atmospheric pressure to force the piston toward the vented portion of the chamber and to introduce thereby a quantity of liquid into the chamber while registering the container with the source of vacuum, and then for registering the bore of the cock with the vacuumized container to reduce the pressure on the liquid in the chamber and on one side of the piston, the other side of the piston being exposed to atmospheric pressure to force the piston toward the cock and the liquid from the chamber and bore into the container.

7. In a filling machine provided with a source of vacuum and a source of liquid under pressure, a filling valve comprising a filling head for sealingly engaging a container presented thereto, a metering chamber vented to atmosphere, a cock in said filling head having a bore opening to said chamber, a sealed, floating piston in said chamber between the vented portion thereof and said bore, adjustable stop means for limiting movement of said piston away from said cock thereby to vary the stroke of the piston and the capacity of the chamber, said cock being normally disposed with its bore in registration with said source of vacuum causing atmospheric pressure to force the piston toward the cock, means for moving the cock relative to the filling head for registering its bore with the source of liquid to thereby force the piston toward the vented portion of the chamber and into contact with said piston stop means to introduce a metered quantity of liquid into the chamber and bore while registering the container with the source of vacuum, and then for registering the bore of the cock with the vacuumized container whereby atmospheric pressure applied to the piston through the vent forces the piston toward the cock and the metered quantity of liquid from the chamber and bore into the container.

8. In a filling machine provided with a source of vacuum and a source of liquid under pressure greater than atmospheric, a filling valve comprising a filling head for sealingly engaging a container presented thereto, a jacket enclosing the container and sealingly engaging the filling head, said filling head having a by-pass tube communicating with said jacket, a metering chamber having a vent in one end thereof, a cock in said filling head having a bore opening into said chamber opposite the vented end thereof, a sealed, floating piston in said chamber, adjustable piston stop means at the vented end of the chamber for limiting movement of the piston toward the same, said cock having a plurality of ports therein, said cock having a first position for venting the by-pass tube and container to atmosphere while registering said bore with the source of vacuum thereby to reduce the pressure on the cock side of the piston below atmospheric for movement of the piston toward the cock, means for moving said cock within the filling head for registering the bore with the source of liquid to force liquid into the chamber and to move the piston against said stop and for registering the container and by-pass tube with said source of vacuum to equally vacuumize the container and jacket, and means for again moving said cock for subsequently sealing the vacuumized jacket while registering the bore with the container for transferring a predetermined quantity of liquid from the metering chamber into the container.

9. In a filling machine provided with a source of vacuum and a source of liquid under pressure greater than atmospheric, a filling valve comprising a filling head for sealingly engaging a container presented thereto, a metering chamber vented to atmosphere, a cock in said filling head having a bore opening into said chamber, a sealed, floating piston in said chamber between the vented portion thereof and the bore of said cock and adapted to be actuated by pressure differentials on opposite ends thereof, said cock being normally disposed with its bore in registration with said source of vacuum causing the pressure in the chamber to be reduced below atmospheric pressure to force the piston toward the cock, means for intermittently moving the cock relative to the filling head for registering its bore with the source of pressurized liquid causing liquid flowing into said bore from said source of liquid to force the piston against atmospheric pressure toward the vented portion of the chamber during registration of the container with the source of vacuum, and then for registering the bore of the cock with the vacuumized container whereby atmospheric pressure applied to the piston forces the latter toward the cock for transferring the liquid from the chamber and bore into the vacuumized container.

10. The combination with a filling machine of a filling unit operatively connected to a source of vacuum and to a source of liquid, a valve operatively connected to said sources of vacuum and of liquid, a metering chamber connected to said valve and vented to atmosphere, a sealed, floating piston in said chamber for sealing said valve relative to atmosphere, said valve having a plurality of ports therein, said valve having a first position adapted to position said ports to communicate said chamber and source of vacuum while a container is presented to said filling unit, said valve having a second position to communicate said source of vacuum with the container while communicating the metering chamber with said source of liquid said valve having a third position to communicate with said metering chamber with the container for transmitting the liquid from the chamber into the container, and valve operating means successively to advance said valve from each position thereof to the next.

11. The combination with a filling machine of a filling unit operatively connected to a source of vacuum and to a source of liquid under pressure greater than atmospheric, a valve operatively connected to said sources of vacuum and of liquid, a metering chamber associated with said valve and vented to atmosphere, a sealed, floating piston in said metering chamber for sealing the valve relative to atmospheric pressure, said valve having a plurality of ports adapted to communicate said source of vacuum with the metering chamber whereby atmospheric pressure on one side of the piston and the reduced pressure on the other side thereof produced by evacuating the metering chamber causes the piston therein to move toward the valve while a container is presented to the same, means for moving said valve in successive steps for next communicating said source of vacuum with said container while communicating said source of pressurized liquid with the metering chamber whereby the greater than atmospheric pressure on the liquid entering the latter causes said piston to move away from said valve, then for communicating said metering chamber with the vacuumized container whereby atmospheric pressure on one side of the piston and the reduced pressure on the other side produced by the opening of the liquid filled chamber to the vacuumized container deposits a measured quantity of liquid into the container and adjustable means associated with said metering chamber and piston for limiting movement of said piston away from said valve for changing the capacity of said metering chamber to suit the capacity of the container presented to said valve.

12. A filling valve for high vacuum filling machine comprising a sealing cap adapted to sealingly engage a container, a seat formation in said filling valve communicable with a container engaged by the sealing cap, a source of vacuum and a source of liquid each separately communicating with said seat formation, a valve cock supported in said seat formation, a track on said valve cock, a metering chamber in communication with and supported by said cock, a spring biased yoke overlying said cock, each arm of said yoke having a roller thereon adapted to ride on said track for holding said cock in juxtaposition in said seat formation, means for imparting intermittent motion to said cock for advancing the latter in steps for first communicating said metering chamber with the source of vacuum while venting the container, then communicating the metering chamber with said source of liquid while connecting said source of vacuum with the container and then communicating the metering chamber with the container.

13. In a vacuum filling and liquid measuring machine for containers, the combination of a rotatable turret for advancing containers to be filled, a rotatable head mounted above said turret and movable therewith, said head having a collapsible measuring chamber associated therewith, an exterior surface of said measuring chamber being exposed to atmosphere, a supply of liquid under pressure greater than atmospheric, means in said head for sealing off individual containers carried by said turret, means cooperating with said sealing means for providing a jacket around the container, means associated with said head for vacuumizing the measuring chamber, to collapse it, means for connecting the vacuumizing means to the container and jacket while connecting the measuring chamber to the source of liquid under pressure to expand the measuring chamber and to fill it with a measured quantity of liquid, and then to connect the measuring chamber and the vacuumized container for discharging the measured quantity of liquid from the measuring chamber into the container.

FRANK W. KRUEGER.
WILLIAM DE BACK.

References Cited in the file of this patent

UNITED STATES PATENTS

| Number | Name | Date |
|---|---|---|
| 2,285,627 | Thompson | June 9, 1942 |
| 2,302,693 | Hoar | Nov. 24, 1942 |
| 2,413,194 | Russell | Dec. 24, 1946 |
| 2,415,109 | Nordquist | Feb. 4, 1947 |
| 2,428,598 | Weaver | Oct. 7, 1947 |

FOREIGN PATENTS

| Number | Country | Date |
|---|---|---|
| 374,971 | France | May 1, 1907 |